Feb. 7, 1967 T. E. BAN 3,302,936
CIRCULAR TRAVELING GRATE MACHINE
Filed Nov. 23, 1964 9 Sheets-Sheet 1

Fig. 1

INVENTOR.
THOMAS E. BAN
BY
*Schramm, Krause & Sturges*
ATTORNEYS.

Feb. 7, 1967 T. E. BAN 3,302,936
CIRCULAR TRAVELING GRATE MACHINE
Filed Nov. 23, 1964 9 Sheets-Sheet 2

INVENTOR.
THOMAS E. BAN
BY
Schramm, Kramer & Stenges
ATTORNEYS

INVENTOR.
THOMAS E. BAN
BY
Schramm, Kramer & Sturges
ATTORNEYS.

Feb. 7, 1967  T. E. BAN  3,302,936
CIRCULAR TRAVELING GRATE MACHINE

Filed Nov. 23, 1964  9 Sheets-Sheet 6

INVENTOR.
THOMAS E. BAN
BY
Schramm, Kramer & Sturges
ATTORNEYS

Feb. 7, 1967 T. E. BAN 3,302,936
CIRCULAR TRAVELING GRATE MACHINE
Filed Nov. 23, 1964 9 Sheets-Sheet 7

INVENTOR.
THOMAS E. BAN
BY
Schramm, Kramer & Sturges
ATTORNEYS

Feb. 7, 1967  T. E. BAN  3,302,936
CIRCULAR TRAVELING GRATE MACHINE
Filed Nov. 23, 1964  9 Sheets-Sheet 9

INVENTOR.
THOMAS E. BAN
BY
Schramm, Kramer & Stenger
ATTORNEYS.

United States Patent Office 3,302,936
Patented Feb. 7, 1967

3,302,936
CIRCULAR TRAVELING GRATE MACHINE
Thomas E. Ban, Cleveland Heights, Ohio, assignor to McDowell-Wellman Engineering Company, a corporation of Ohio
Filed Nov. 23, 1964, Ser. No. 412,915
15 Claims. (Cl. 263—28)

This invention, as indicated, relates to traveling grate machines, and more particularly to horizontal circular traveling grate machines.

The invention will be described in reference to a circular traveling grate machine in which the grate rotates about a vertical axis between upper and lower gas confining hoods and windboxes and which are useful in the process for making agglomerates and coke, and for carrying out other destructive distillation and pyrolytic procedures.

The machine is characterized by a plurality of individually tiltable pallets which are movable along a circular trackway. The pallets have grates as the bottom and move together for bed conveying action along the trackway. A hood is mounted above the trackway adjacent the moving pallets, and a windbox is secured below the trackway adjacent the pallets. Burners for supplying initial ignition, or heat, e.g. for drying the "green" balls of pelletized material or for igniting or firing a fuel or gaseous firing of solids located in various sections of the hood. By the term "green" in reference to pellets and aggregates, is meant the moist unfired particles.

In operation, the grates are first charged with crushed or nodularized or balled materials, some of these, for example, balled materials, may require a predrying operation prior to high temperature interaction. This is acquired in a separate zone which can be followed by higher temperature zones in sequence. The materials may finally be cooled in a terminal cooling zone. All the heat exchanging operations can be carried out by forced draft convection as accomplished by blowers and duct, windbox, and hood connections.

A process of coking of coal requires inert atmospheres or atmospheres that contain very small controlled amounts of oxygen. Also, the reduction of metallic oxides generally requires an atmosphere containing combustible mixtures of reducing gases, such as, carbon monoxide and hydrogen. In order to perform the above-mentioned processes with economy, it has been found necessary to recycle the draft. This invariably requires transmission of draft from one stage to another. Frequently it is essential to prevent insofar as is possible leakage of air or ambient gases into the apparatus, and to this end sealing means are provided. Systems that are not sealed properly have leakage, and this tends to cause the gaseous heat transfer system to be out of composition control, and thus out of temperature control.

This invention solves this problem by providing a circular traveling grate machine with a liquid sealing means coacting between the arcuate marginal edges of the hood, the moving pallets, and the windbox, respectively, to seal the traveling grates from the ambient atmosphere. Thus, the conditions for destructive distillation and pyrolytic reactions, e.g. making agglomerates and coke can be readily controlled, and desirable end products continuously made economically and in large or small quantities.

Another feature of the liquid cooled side walls is that it enables severe temperatures to be applied within the processing zone with negligible damage to the side wall material. Also, refractories can be applied adjacent the side wall that is within the reaction zone, and the liquid cooled feature enables refractory to be attached with minimum damage usually caused by thermal warping of the members. The liquid, e.g. water thus serves two purposes, a cooling medium and a sealing medium.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings.

Briefly stated this invention is in a circular traveling grate machine having a plurality of individually tiltable pallets with grates integral therewith. The pallets are movable along a circular trackway and are for the major portion of the travel around the trackway in abutting relation for bed conveying action therealong. The traveling grate machine is further characterized by gas confining chambers above and below the trackway. The chamber above the trackway is a hood mounted above the track adjacent the moving pallets. The chamber below the trackway is a windbox supported adjacent the moving pallets. Also provided is a water seal between the inner and outer marginal edges of the hood, pallets, and windbox, respectively. Water containing troughs with sealing flanges extending therein coact between adjacent respective parts of the traveling grate machine to seal the pallets from the ambient atmosphere. In the preferred embodiment, the water is circulated in troughs along each arcuate marginal edge of the windbox. A sidewall having spaced parallel marginal edges, is secured adjacent the inner and outer marginal edges of the pallets. One marginal edge of the sidewalls extends below the pallets into the adjacent windbox troughs, and the other marginal edge of the sidewalls extends above the pallets and has secured therealong a similar trough for circulating water therein. A flange secured to each arcuate marginal edge of the hood, extends into the adjacent trough secured to each sidewall and into water circulated therein. In this manner each of the moving pallets is sealed from the ambient atmosphere.

Figure 1:
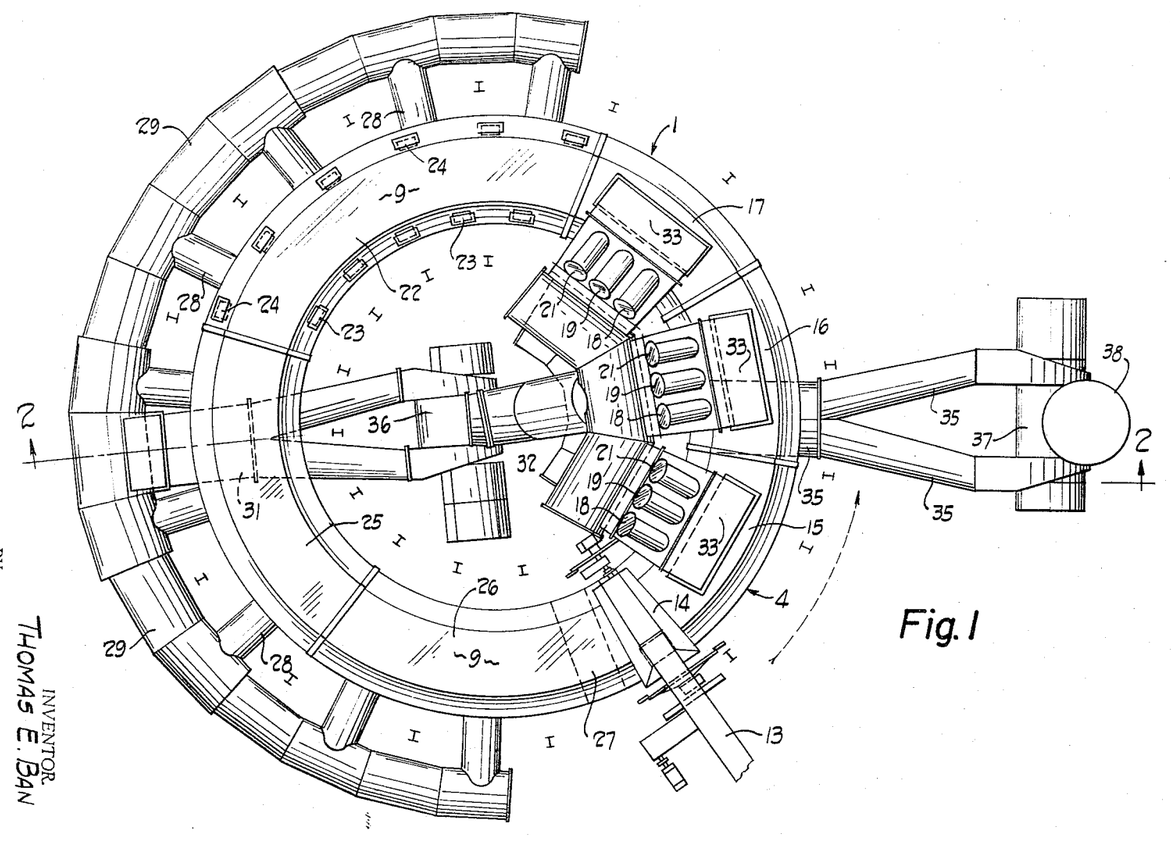
FIG. 1 is a top view of a circular grate machine in accordance with this invention.
Figure 2:
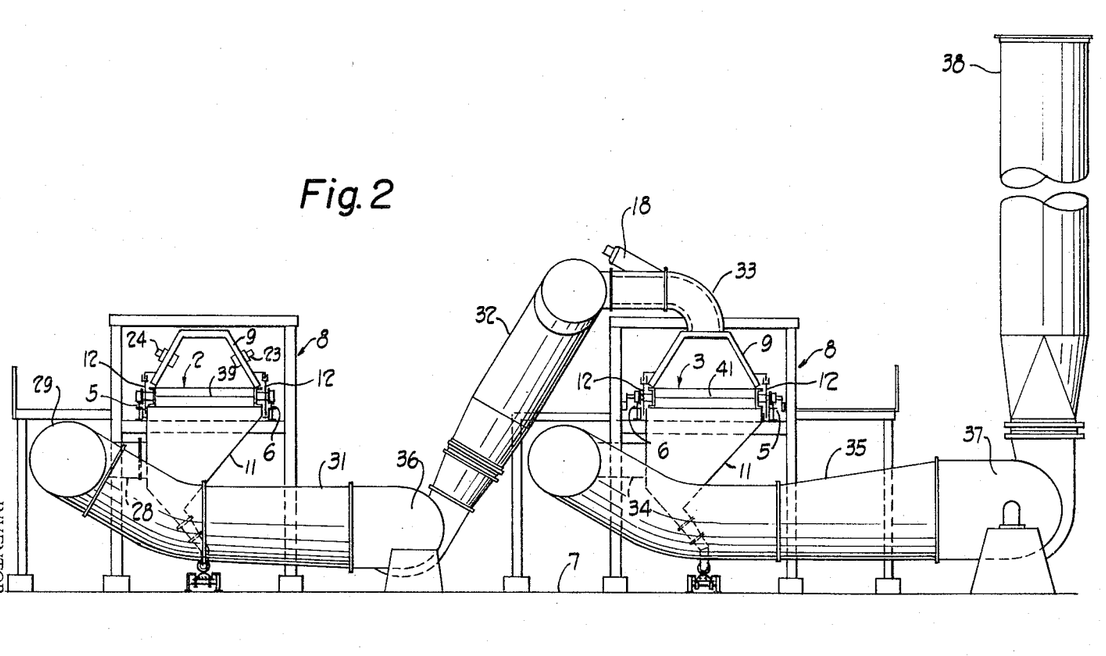
FIG. 2 is a cross-sectional view taken in the plane indicated by the line 2—2 of FIG. 1.

Referring more particularly to FIGS. 1 and 2 of the annexed drawings, there is shown a traveling grate machine, generally indicated at 1. The traveling grate machine 1 is composed of a plurality of individual pallets, e.g. pallets 2 and 3, secured together for unitary conveying movement along a closed circular trackway, generally indicated at 4, composed of rails 5 and 6. The circular trackway 4 is supported in spaced relation to the ground or floor 7 by any suitable super structure, generally indicated at 8, framed from conventional structural members.

Mounted above the trackway 4, adjacent the pallets, is a gas confining chamber known as a hood generally indicated at 9. Mounted or secured below the trackway 4, adjacent the pallets and in spaced relation to the hood 9 is a second gas confining chamber known as a windbox generally indicated at 11. The means for sealing the annular spaces between the windbox 11, the pallets and the hood 9 and generally indicated at 12.

The dotted arrow adjacent the traveling grate machine 1, seen in FIG. 1, shows the normal direction of pallet travel. In operation, the green pellets or unfired particles are brought to the traveling grate machine by a conveyor 13. The particles are charged to the grates of the pallets, e.g. grates 39 and 41 of pallets 2 and 3, respectively, by any suitable spreading means, e.g. hopper 14. The unfired particles are gradually exposed to heat in the drying zones, e.g. drying zones 15, 16, and 17.

A plurality of burners, e.g. burners 18, 19 and 21, in the hood 9 in each drying zone, heats air circulated through the moving pallets of the traveling grate machine 1. The pallets with the dried particles thereon, move into the firing zone generally indicated at 22. A plurality of ignition burners, e.g. burners 23 and 24, are spaced along the hood 9 in the firing zone 22 to ignite the charge on the pallets. From the firing zone 22, the pallets move into the terminal firing and cooling zones e.g. zones 25 and 26, respectively.

The pallets then move from the cooling zone 26 into the dumping zone, e.g. dumping zone 27, where the pallets are individually tilted and material dumped therefrom. Air is circulated and recirculated throughout the traveling grate machine 1 by conventionally designed pipes connecting the various zones, e.g. pipes 28, 29, 31, 32, 33, 34 and 35. The air is forced through the pipes by a plurality of fans, e.g. fans 36 and 37. The air after being recirculated is exhausted from an exhaust stack 38.

The description of the various zones has been given in reference to one particular embodiment of the invention, it being understood, however, that the zones may be varied along the traveling grate machine depending on the material and the process involved. For example, the process may require several points of discharge as well as several points where material is charged to the grates of the pallets.

Referring more particularly to FIGS. 3-7 there is shown the pallets and the means for driving the pallets, as well as the means for individually dumping the pallets. The pallets moving along the circular trackway 4 are similar, therefore, their description will be in reference to a single pallet, e.g. pallet 3.

The pallet 3 is pie-shaped having the grate 41 secured therein. The longitudinal axis of the pallet 3 is indicated by the dotted line 42. Axles 43 and 44 extend from the outer and inner circumferential edges, respectively, of the pallets 3, and are preferably aligned with the longitudinal axis 42. Trolley wheels 45 and 46 are rotatably mounted on the axles 43 and 44, respectively, and ride on rails 5 and 6, respectively, of trackway 4. Drive wheels 47 and 48 are secured to the axles 43 and 44 adjacent wheels 45 and 46, respectively, for driving coaction with rotating pinions 49 and 51, respectively. Pivot arms 50 and 50a are secured to the ends of the axles 43 and 44, respectively. When the pallets are moving along the trackway, the pivot arms 50 and 50a extend downwardly therefrom. Dump wheels 52 and 53 are rotatably secured to the ends of pivot arms 50 and 50a, respectively, for coaction with dump rails to rotate the pallets causing material on the grates to be dumped therefrom. The means for dumping will hereinafter be more fully described.

Figure 3:
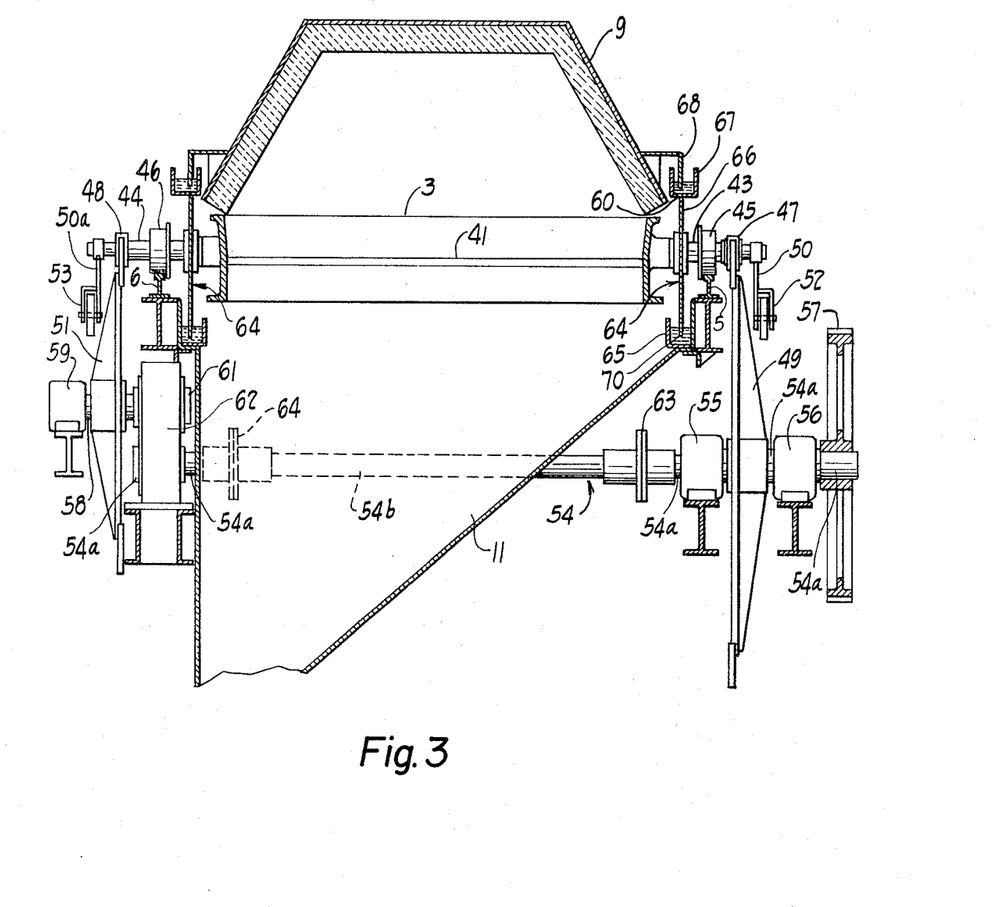
FIG. 3 is an enlarged cross-sectional view of a pallet, hood, water seal, and driving mechanism used in the embodiment of the invention shown in FIG. 1.

The pinion or sprocket 49 is secured to an axle generally indicated at 54, which is journaled for rotation in pillow blocks 55 and 56. A drive gear 57 is secured to the end of the axle 54 adjacent the pillow block 56. The gear 57 coacts with other gears (not shown) which are caused to rotate by any suitable driving means, e.g. a conventionally designed motor (not shown). The pinion or sprocket 51 adjacent the inner periphery of the trackway 4, is secured to axle 58 which is journaled for rotation in the pillow blocks 59 and 61. The axle 58 rotatingly coacts with axle 54 through a gear box generally indicated at 62. The inner periphery of the trackway 4 is shorter in circumference than the outer periphery, therefore, the individual pallets move a shorter distance along their inner peripheries. To compensate for this difference in movement, the pinion 51 has a smaller diameter than pinion 49, and has more teeth. For example, if the outer pinion 49 had 8 teeth, the inner pinion 51 would have 10 teeth. The rotation of the axle 58 would also be less than that of axle 54. To accomplish this a gear box 62 is provided. A pair of safety slip discs, e.g. discs 63 and 64, interrupt the axle 54 adjacent the pillow block 55 and the gear box 62, to permit slippage between adjacent sections 54a and 54b of the rotating axle 54, thereby keeping the pinions 49 and 51 in well meshed driving coaction with drive wheels 47 and 48, respectively.

The means for sealing the annular spaces between the inner and outer marginal edges of the windbox 11, the pallet 3, and the hood 9, respectively, are generally indicated at 64. The means for sealing the outer and inner marginal edges of the trackway 4 are similar; therefore, the description will be in relation to the means for sealing the outer marginal edge of the trackway 4. In one embodiment of the invention, a trough 65 having cooling liquid therein is secured along the top arcuate marginal edge of the windbox 11 adjacent the pallets. A continuous flange or sidewall 66 having spaced parallel marginal edges 60 and 70, is secured to the pallets adjacent their outer arcuate edges. The pallet axle 43 extends through the outer sidewall 66 and is journaled for rotation therein. The pallet axle 44 extends through the inner sidewall and is similarly journaled for rotation therein. The pallets, as they ride along the trackway 4, provide support for the sidewalls. The sidewall marginal edge 70 extends below the pallets into the trough 65, and coacts with the liquid therein to seal the annular space between the pallets and the windbox 11. A trough 67 is secured along the sidewall marginal edge 60. The trough 67 is also designed to hold liquid. A dip plate or flange 68 is secured to the arcuate marginal edge of the hood 9, and extends into the trough 67, for coaction with the fluid therein, to seal the annular space between the pallets and the hood 9.

The width of each sidewall or the distance between its marginal edges may desirably vary with the process for which the machine is principally used. For example, the bed or burden charged to the grates of the pallets may vary in depth from a few inches to perhaps six, eight or ten feet. Each sidewall will be designed to extend above such a burden. Other factors such as special hood or windbox design might regulate the size of the sidewall.

The depth and width of each trough may also vary with the process. Besides sealing the spaces between the hood, pallets and windbox, respectively, the liquid containing troughs act as a temperature regulating barrier. For example, it may be desired in certain processes, to have sidewalls with cooling liquid circulated therein. In such a case, the troughs could act as the sidewalls of the machine. This could be accomplished by increasing the depth of the troughs and decreasing the "exposed" depth of the flange. By "exposed" depth is meant the part of the flange exposed to the ambient atmosphere.

In another embodiment of the invention (FIG. 14), a liquid containing trough is secured to each arcuate marginal edge of the windbox and hood, respectively. The inner and outer sidewalls 66 secured adjacent each arcuate marginal edge of the pallets, is designed or configured to extend therefrom, into an adjacent hood and windbox trough, and into the liquid therein, to seal the spaces therebetween. Although other trough and flange arrangements are conceivable, the two embodiments described are for most purposes, the most practical.

Figure 4:
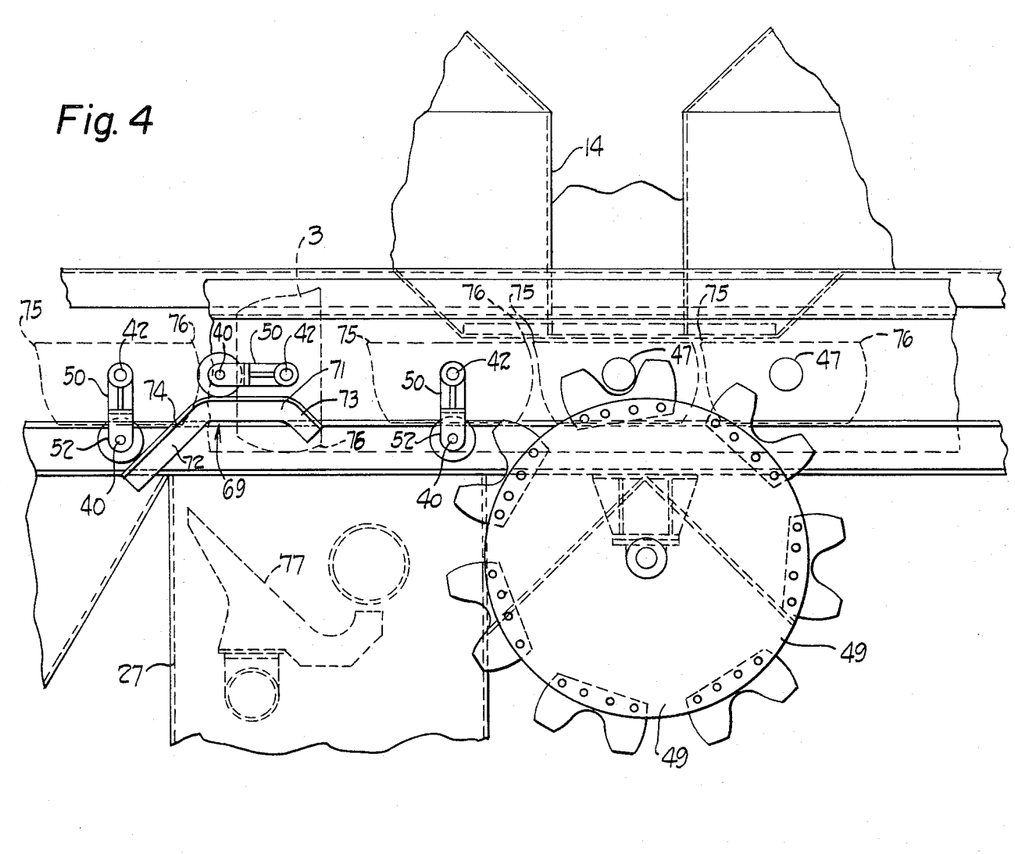
FIG. 4 is an enlarged fragmentary view of a portion of the driving mechanism, and the dumping mechanism used in the embodiment of the invention shown in FIG. 1.
Figure 5:
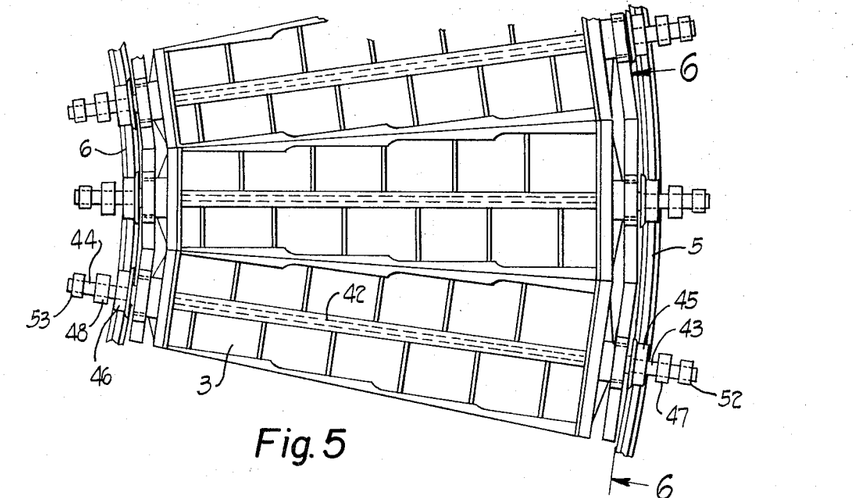
FIG. 5 is an enlarged top view of the pallet in FIG. 3.

Referring more particularly to FIG. 4 of the annexed drawings, there is shown the means for dumping each pallet. Also shown, in greater detail, is the driving pinion or sprocket 49 in driving coaction with the drive wheel 47. In the dumping area 27, a dump rail, e.g. rail 69, is secured to each side of the trackway 4 for dumping coaction with the dump wheels 52 and 53 secured to pivot arms 50 and 50a, respectively, which extend from the ends of the axles 43 and 44, respectively.

Description of the dump rails will be in reference to dump rail 69, which is secured to the trackway 4 adjacent its outer periphery. A similar dump rail is secured to the trackway 4 adjacent its inner periphery. Dump rail 69 is formed by rail section 71 which parallels the trackway 4, and sloped or inclined rail sections 72 and 73 which are secured to the ends of rail section 71, diverge therefrom in a downward direction.

As the pallet 3 moves along the trackway 4, the rotational axis 40 of the dump wheel 52 is preferably, vertically aligned with the longitudinal axis 42 of the pallets. As the pallet 3 moves over the dump rails, the dump wheel 52 first contacts the section 72 of the dump rail 69. As the dump wheel 52 moves up the inclined surface 74 of the section 72, the pivot arm is rotated about the pallet axis 42. As the dump wheel 52 moves along rail section 71, the pallet 3 is held tipped in dumping position until material on the grates is discharged. In dumping position, the dump wheel axis 40 is preferably horizontally aligned with the pallet axis 42. Moving along the trackway 4, the dump wheel 52 then rolls down section 73 of the dump rail 69, and the pallet 3 is rotated back to its normal conveying position on the trackway 4. The unloaded pallet 3 then moves under the hopper 14, where it is sequentially reloaded with more material to form a bed and the particular process is repeated.

Figure 6:
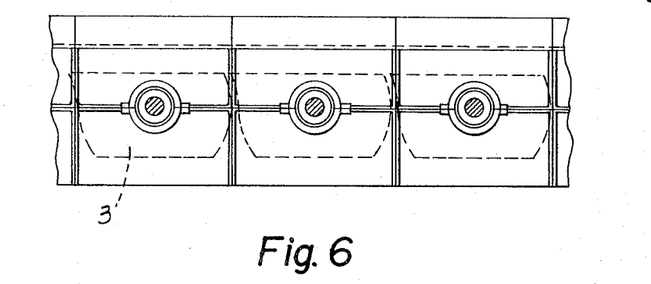
FIG. 6 is an enlarged end view of the pallets taken in the plane indicated by the line 6—6 of FIG. 5.
Figure 7:
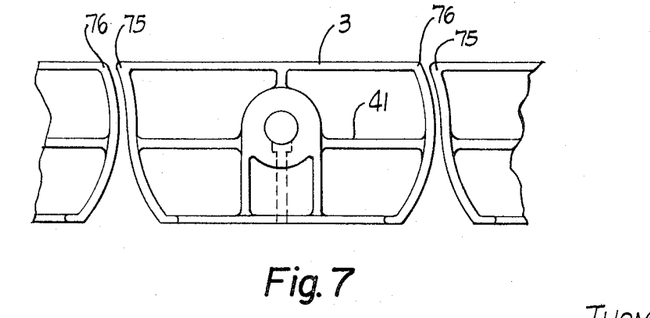
FIG. 7 is a cross-sectional view of one of the pallets of FIG. 5.

The sequence of tilting the pallets is illustrated in FIG. 4. As seen in FIGS. 4, 6 and 7, the pallets are designed that the trailing edge 75 of one pallet extends over the leading edge 76 of the trailing pallet. This permits rotation of the pallets in one direction, whereby the material therein can only be dumped over the leading edge 76. A grizzly 77 (shown in dotted line) may be used in the dumping zone 27 to separate the materials of different particle size.

Figure 8:
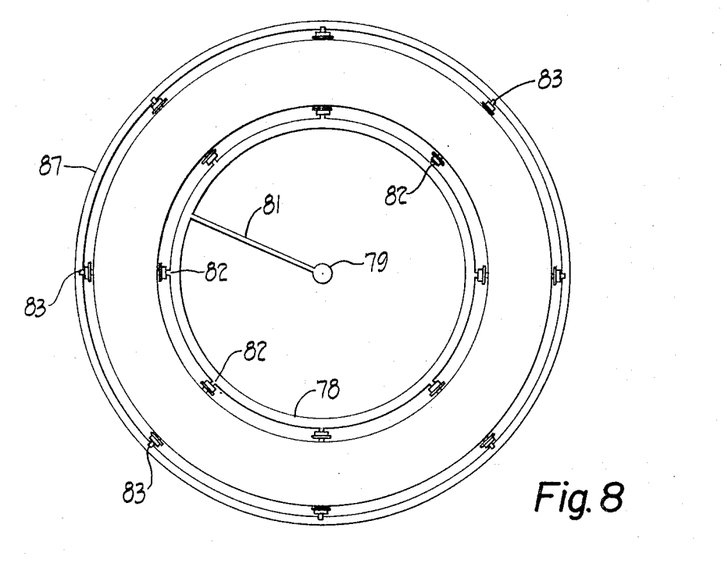
FIG. 8 is a top view of the circular grate machine showing a rotary water coupling used to provide water to the pallets.
Figure 9:
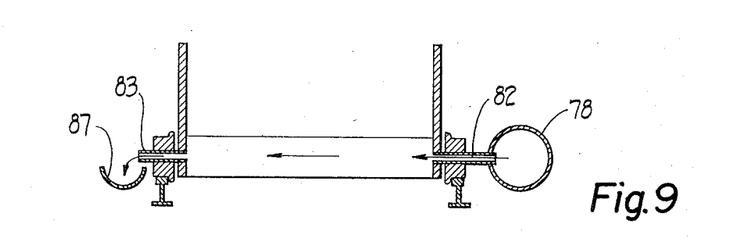
FIG. 9 is a cross-sectional end view of one type of water cooled pallet showing the flow of cooling water therethrough.
Figure 10:
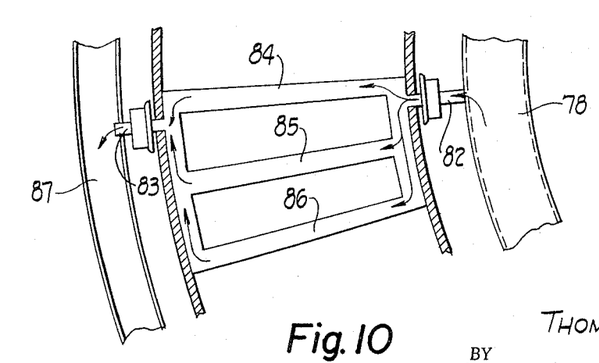
FIG. 10 is a cross-sectional top view of the pallet of FIG. 9 showing the flow of water therethrough.

The embodiment of the pallet shown in FIGS. 8, 9 and 10 is designed to have cooling liquid, such as water circulated therethrough. Liquid is circulated through the pallets from an annular liquid main 78 adjacent the inner periphery of the pallets. The main 78 is secured to, and rotates with the pallets. Liquid is pumped from a source (not shown) through a rotating coupler 79 into the fluid main 78 through a feeder pipe 81 communicating therebetween. However, water or liquid may be admitted to the main 78 from a pump (not shown) which rotates with the main and received water from a connected rotating canal which in turn receives water from a stationary line.

The pallet axles, e.g. axles 43 and 44, respectively, have therein an inlet passageway 82 and an outlet passageway 83. The liquid main 78 is secured to the end of the axle 43 and communicates with the inlet passageway 82. In this manner liquid is pumped from the liquid main 78, through the inlet passageway or port 82, and circulated in lines or pipes, e.g. lines 84, 85 and 86, in the pallets.

The cooling liquid is forced or pumped from the circulating lines 84, 85 and 86, through the discharge outlet, passageway or port 83 in the axle 44, and into a stationary drainage canal 87 adjacent the outer peripheral of the trackway 4. The warmed liquid from the canal 87, may be cooled and recirculated through the main 78 into the pallets. Cooling the pallets permits the use of lighter weight members in their construction. Greater pallet spans may be used. Fabrication costs are also kept at a minimum. A water cooled pallet can be constructed in a manner to act as a very large heat sink for draining heat from the grate bars, thus, extending the useful life of the grate bars considerably. Also, severe processing temperatures can be applied without damage to the grates and other members of the pallets.

Figures 11, 12:
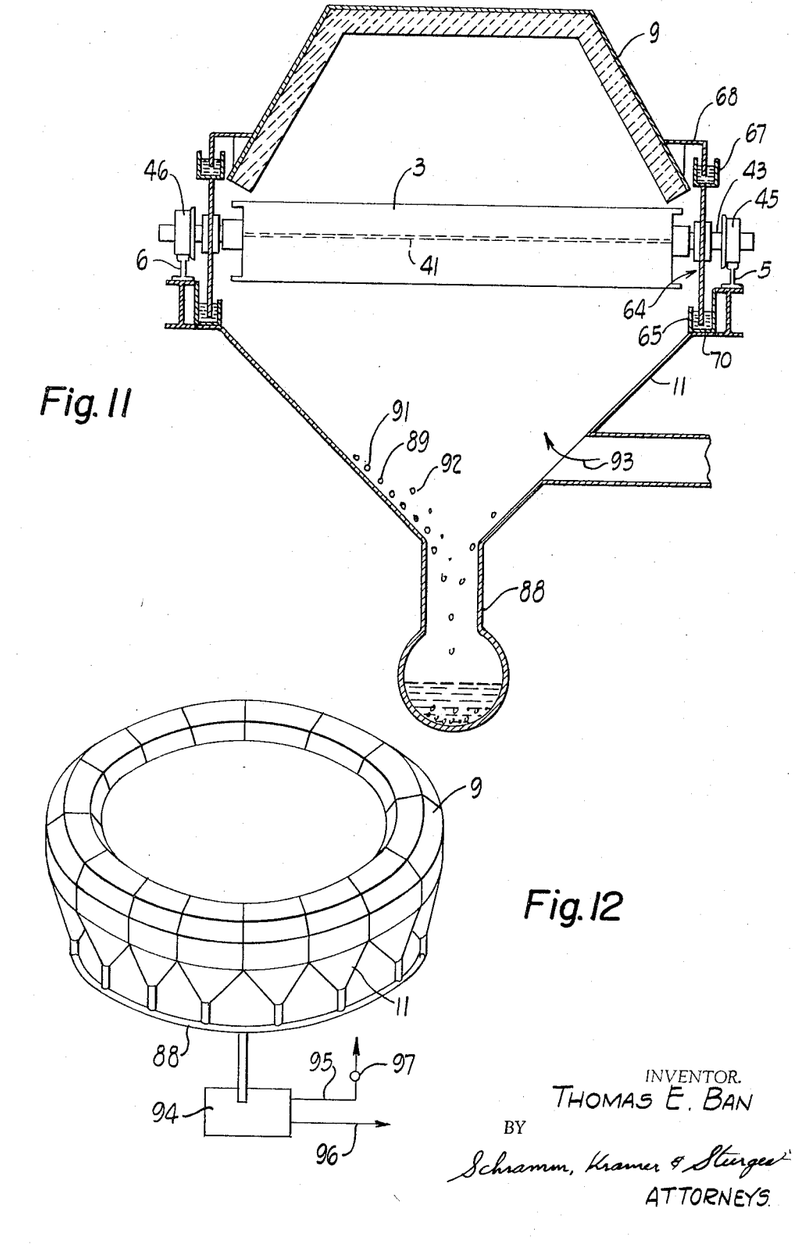
FIG. 11 is a cross-sectional view of one type of windbox used in a hydraulic system for removal of windbox fines while maintaining the draft seal.
FIG. 12 is a schematic drawing of the hydraulic system for removal of windbox fines.

FIGS. 11 and 12 show in particular one means for removing the trickled fines without breaking the liquid seal. The windbox 11, in this embodiment, is V-shaped and has secured along its marginal apex, an enclosed water trough 88. Trough 88 is designed to have water or other liquid circulated therein. The trickled fines, e.g. fines 89, 91 and 92 drop from the windbox 11 into the trough 88, and are carried away by the liquid circulated therethrough. The arrow at 93 in FIG. 11 indicates the draft flow. The water with the trickled fines carried therein, flows from the trough or drain conduit 88 into a sand sump, generally indicated at 94. The sump 94 removes the water 95 and the trickled solids 96 while providing a water seal for preventing draft infiltration. The solids 96 are removed and the water 95 is recirculated in the trough 88 by any suitable means, e.g. pump 97.

Figure 13:
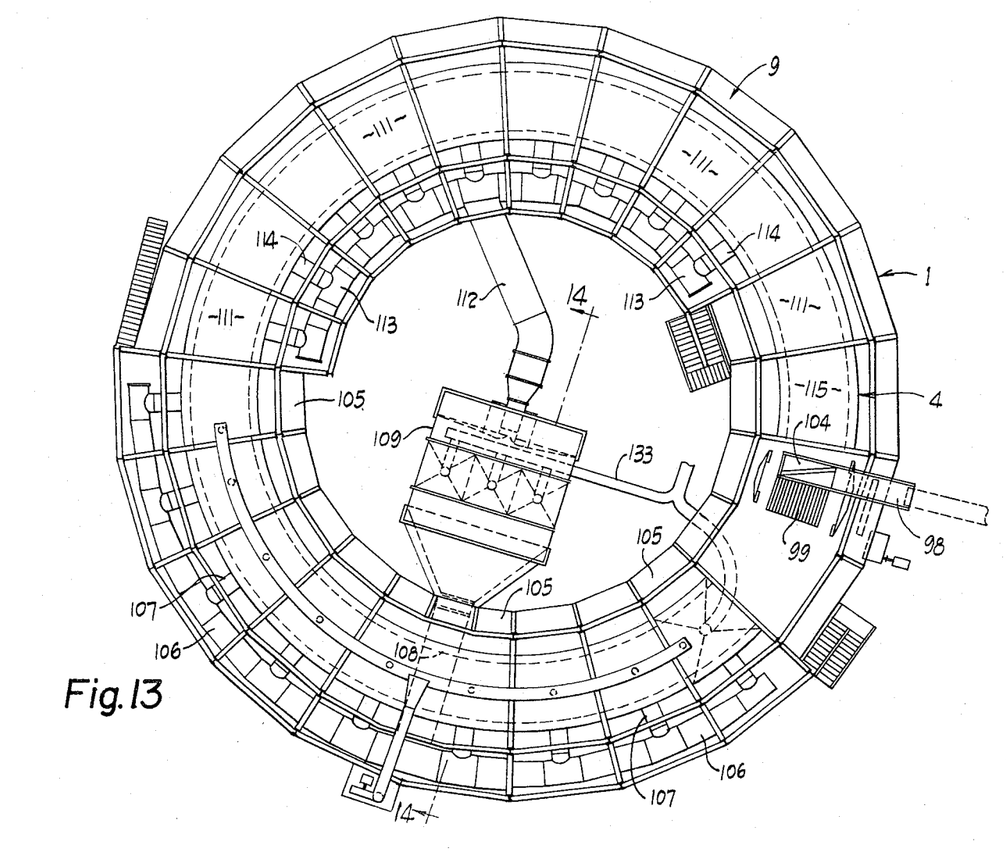
FIG. 13 is a top view of another embodiment of this invention useful in the process for removing oil from oil bearing shale.
Figure 14:
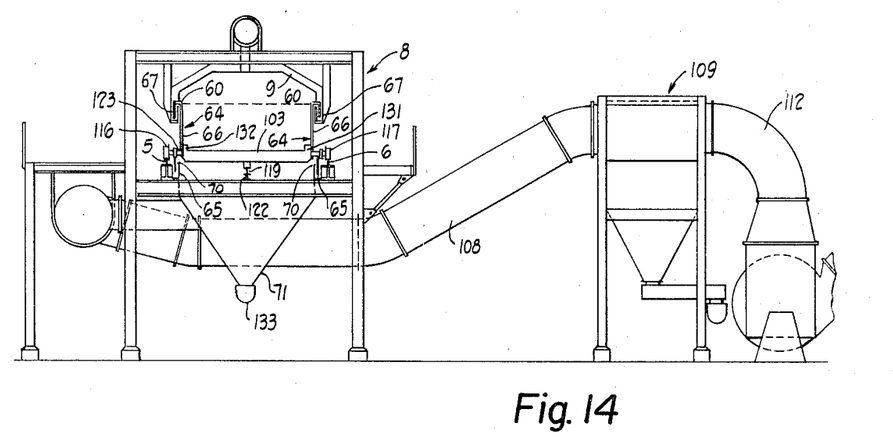
FIG. 14 is a cross-sectional view of the embodiment taken in the plane indicated by the line 14—14 of FIG. 13.
Figure 15:
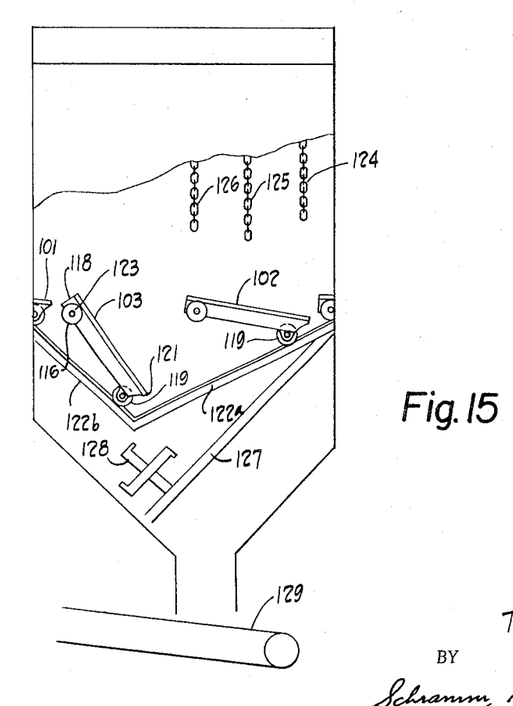
FIG. 15 is an enlarged fragmentary view of the dumping apparatus used with the embodiment of FIG. 13.

Referring more particularly to FIGS. 13–15 there is shown a traveling grate machine 1, used for removing oil from oil bearing shale. Machine 1 is similarly formed from a plurality of pallets, e.g. pallets 101, 102, and 103, which are movable along a circular trackway 4 mounted on conventionally designed super structure 8. A hood 9 and windbox 11, respectively, are mounted above and below the trackway 4.

In operation, crushed shale is brought to the machine 1 on a conveyor 98. The shale is layered upon the grates, e.g. grate 99, of the pallets through the hopper 104, forming a burden or bed thereon. The burden may vary in depth from several inches to 8 or 10 feet depending on the amount of shale desired to be processed.

The burden ladened pallets move into a first zone, indicated at 105, where hot gases are fed through pipes, e.g. pipes 106 and 107, into the hood 9, and forced downwardly through the burden. The oil in the shale is taken off in the hot stream of gases in the form of a mist or a fog. The hot stream of gases is forced into the windbox 11, and taken therefrom through pipes, e.g. pipe 108, into a cyclone separator 109, where the oil is separated from the gases.

The pallets then move into a second zone or cooling zone, generally indicated 111, where the substantially cooled gases are forced into the windbox 11 through pipes, e.g. 112, 113 and 114, and passed upwardly through the now spent shale into hood 9. The gases as they pass through the spent shale are reheated. The reheated gases are then recycled back through a new burden in the first zone 105.

A portion of the recycled gases may be vented from the hood 9 in the second zone 111. Also, air may be induced into the hood 9 in the first zone 105, to cause burning of a portion of the combustibles to raise the temperature of the recycled gases.

The pallets then move into a dumping zone 115, where the spent shale is dumped from the pallets by any suitable means. The preferred means for dumping the spent shale from the pallets will be hereinafter more fully explained.

As previously mentioned, the depth of the burden may be as high as 8 to 10 feet. In such cases, the pallets used in this process are very shallow in depth. The pallets are preferably mounted on 3 wheels, i.e. a pair of wheels adjacent its front or leading edge, and a single wheel adjacent its back or trailing edge intermediate its marginal edges. For example, pallet 103 is mounted on a pair of wheels 116 and 117 adjacent its leading edge 118, and a third wheel 119 adjacent its trailing edge 121. The wheels 116 and 117, respectively, are movable along the rails 5 and 6 of trackway 4. The wheel 119 is movable along a dump rail 122 disposed centrally of the trackway 4.

The wheels 116 and 117 are mounted on the ends of pallet axle 123, which is journaled in the sidewalls 66 adjacent the inner and outer arcuate marginal edges of the pallets. This permits the pallets to be rotated about the axis of the axle 123.

The middle rail 122 is normally in a horizontal plane and keeps the pallets in their normal conveying position. In the dumping area, however, the dump rail 122 declines in a direction below its normal plane. As the pallets move into the dumping zone (FIG. 15), the wheel 119 rolls down the dump rail 122a which causes rotation of the pallet about the axis of the axle 123, whereby the burden on the grates of the pallets is dumped therefrom over the trailing edge 121. As the pallets move out of the dumping zone the wheel 119 moves up the dump rail 122b, which causes the pallet to rotate back to its normal conveying position.

A plurality of chains, e.g. chains 124, 125, and 126, hanging from the hood 9 in the dumping zone 115, helps in removing the spent burden from the pallets, as they momentarily retard the spent burden to help it slide from the grates on the pallets. Any suitable means may be used to remove the dumped burden from the area. For example, the spent burden or shale may be dumped from the pallets into a hopper 127 having a rotating star gate feeder 128 for feeding the shale onto a conveyor, indicated at 129, which carries the shale to any suitable waste bin or means for removing the shale from the area, e.g. truck or railroad car.

Means for sealing the annular spaces between the windbox 11, the pallets, and the hood 9, indicated at 64, differ from those shown in FIG. 3 in that liquid containing troughs, e.g., trough 67, are secured to the inner and outer arcuate marginal edges of the hood 9, instead of being secured to the upper marginal edge 60 of the sidewall 66.

The upper marginal edge 60 of each sidewall 66, is formed to extend into the adjacent trough 67 secured to the hood 9 for sealing coaction with the water therein. The upper marginal edge 60 is reversely bent to extend into the adjacent hood trough 67.

The troughs, e.g., trough 65, secured to the upper, inner and outer arcuate marginal edges of the windbox 11, are adjacent the arcuate marginal edges of the pallets, and not encompassed in the width of the pallets, to prevent fines of the shale from falling into the troughs. Therefore, as seen in FIG. 14 the lower marginal edge 70 of the flanges 66 is offset to extend into the fluid containing troughs, e.g., trough 65, which are secured to each upper arcuate marginal edge of the windbox 11. Because of the high bed or burden, the marginal edges or sides, e.g., sides 131 and 132, of the pallets laterally extend to the sealing flanges 66 to keep the burden on the traveling grates. The width of the sidewall 66 above the pallets depends on the height of the burden. The windbox 11 may be provided with a sealed trough 133 for removing the trickled fines as heretofore described.

Thus there has been provided a new and novel circular traveling grate machine, wherein the atmospheric conditions under which the reactions take place, may be controlled. As herebefore described, this is accomplished by sealing the annular spaces between the hood, pallets and windbox, respectively. In another embodiment of this invention water or liquid in the troughs may be utilized to cool the sidewalls which enables severe temperatures to be applied within the processing zone with negligible damage to the sidewall material. Also, refractories can be applied adjacent the sidewall that is within the reaction zone. The water cooled feature enables refractory to be attached with minimum damage usually caused by thermal warping of the members. Thus, the water may serve two purposes, i.e., a cooling medium and a sealing medium.

Also provided are liquid cooled pallets for use in the circular traveling grate machine. A central rotary coupler supplies cold water or other cooling liquid to a circular main that moves with the inner sidewall of the pallets. The main supplies cold liquid through the pivoting axle of the pallets. The water is circulated through the water pallet and emerges as warm water from the axle at the pallets outer periphery. The warm water is carried away by a stationary gathering trough. The water may then be cooled and recirculated through the pallets, or discarded. There are many design features that can be utilized in improvement of this principle for continuously supplying cooling liquid to the pallets moving in a continuous ring. One design, contemplated provides a valving arrangement that can conserve water by opening the flow within the pallet only during the period of highest need, i.e., when the pallet is in a sector of the highest processing heat. Valves can be activated by either limit switches that engage fixed dogs or by thermosensitive devices.

There may also be provided a hydraulic system for removing the windbox fines. This feature enables trickled material from the windboxes to be removed from the system without allowing any draft escapage.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention—

1. A horizontally disposed circular traveling grate machine comprising in combination:
 (a) a circular trackway;
 (b) a plurality of gas permeable pallets movable on and guided by said trackway, each pallet having a material supporting grate formed of spaced grate elements;
 (c) means for moving the pallets along the trackway;
 (d) stationary gas confining hood means disposed above the trackway and the pallets covering at least a portion of the trackway;
 (e) stationary gas confining windbox means disposed below the trackway in chamber forming relation with said hood;
 (f) liquid sealing means coacting between the upper region of the moving pallets and the lower region of the stationary hood means; and
 (g) liquid sealing means coacting between the lower region of the moving pallets and said upper region of the stationary windbox means
whereby the chamber defined by the hood means and the windbox means is sealed at its marginal edges from the ambient atmosphere.

2. A horizontally disposed circular traveling grate machine comprising in combination:
 (a) a closed circular trackway;
 (b) a plurality of gas permeable pallets having radially spaced inner and outer edges and converging sides extending between said inner and outer edges, said pallets movable on and guided by said trackway, each pallet having a material supporting grate formed of spaced grate elements;
(c) means for moving said pallets along the trackway;
(d) gas stationary confining hood means disposed above the trackway and the pallets covering at least a portion of the trackway;
(e) stationary gas confining windbox means disposed below the trackway in chamber forming relation with said hood;
(f) inner and outer liquid sealing means disposed adjacent the inner and outer edges of said pallets and coacting between the upper region of the moving pallets and the lower region of the stationary hood means;
(g) inner and outer liquid sealing means disposed adjacent the inner and outer edges of said pallets and coacting between the lower region of the moving pallets and the upper region of the stationary windbox means;
whereby the chamber defined by the hood means and the windbox means is sealed at its marginal edges from the ambient atmosphere.

3. A machine in accordance with claim 2 in which each of the liquid sealing means includes a trough for containing liquid and a flange submergible in liquid contained in said trough to form a gas barrier.

4. A machine in accordance with claim 2 in which the gas confining hood means extends through 360° of circular arc.

5. A machine in accordance with claim 2 in which the gas confining windbox means extends through 360° of circular arc.

6. A machine in accordance with claim 2 in which both the gas confining hood means and the gas confining windbox means extend through 360° of circular arc.

7. A horizontally disposed circular traveling grate machine comprising in combination:
(a) a circular trackway;
(b) a plurality of wheeled pallets movable on and guided by said trackway, and each having radially spaced inner and outer edges and converging sides extending between said inner and outer edges, and each pallet having a material supporting grate formed of spaced grate elements;
(c) means for moving said pallets along said trackway;
(d) stationary circumferential gas confining hood means having inner and outer bottom marginal edges adjacent the trackway and disposed above said circular trackway and the pallets disposed thereon;
(e) stationary circumferential gas confining windbox means having inner and outer top marginal edges adjacent the trackway and disposed below said circular trackway in chamber forming relation with said hood means;
(f) inner and outer side walls for said chamber movable with said pallets and journaled for relative rotation with respect to said pallets, and having spaced parallel marginal edges;
(g) inner and outer liquid sealing means coacting between the top and bottom marginal edges of said side walls and the respective inner and outer bottom marginal edges of said stationary hood means and the inner and outer edges of said stationary windbox means, respectively,
whereby the chamber defined by the hood means and the windbox means is sealed around its inner and outer peripheries from the ambient atmosphere.

8. A machine in accordance with claim 7 wherein each said liquid sealing means is comprised of a liquid-containing trough and a flange having an edge submerged therein, in each of said sealing means, one of said trough and said flange being stationary and the other being movable relative thereto.

9. A machine in accordance with claim 7 said inner and outer side walls have a liquid-containing trough disposed along one marginal edge and a submergible marginal edge in spaced parallel relation thereto.

10. A machine in accordance with claim 9 in which the liquid-containing trough is disposed along the upper marginal edge of each of said side walls, respectively, and the lower marginal edges are submergible edges.

11. A machine in accordance with claim 10 including downwardly depending stationary circumferential flanges secured to the inner and outer margins of the gas confining hood for gas sealing coaction with said troughs.

12. A machine in accordance with claim 11 including an annular liquid containing trough secured to the upper inner and outer marginal edges of said gas confining windboxes respectively, for gas sealing coaction with the lower marginal edges of said inner and outer side walls.

13. A machine in accordance with claim 7 in which the pallets include liquid cooling means.

14. A horizontally disposed circular traveling grate machine comprising in combination:
(a) a circular trackway;
(b) a plurality of wheeled pallets movable on and guided by said trackway, and each having radially spaced inner and outer edges and converging sides extending between said inner and outer edges, and each pallet having a material supporting grate formed of spaced grate elements;
(c) means for moving said pallets along said trackway;
(d) stationary circumferential gas confining hood means having inner and outer bottom marginal edges adjacent the trackway and disposed above said circular trackway and the pallets disposed thereon;
(e) stationary circumferential gas confining windbox means having inner and outer top marginal edges adjacent the trackway, said windbox means being disposed below said circular trackway and the pallets disposed thereon;
(f) means for removing gas entrained materials coacting with said windbox means;
(g) inner and outer side walls for said chamber movable with said pallets and journaled for relative rotation with respect to said pallets, and having spaced parallel marginal edges;
(h) inner and outer liquid sealing means coacting between the top and bottom marginal edges of said side walls with the respective inner and outer bottom marginal edges of said stationary hood means and the inner and outer edges of said stationary windbox means, respectively,
whereby the chamber defined by the hood means and the windbox means is sealed around its inner and outer peripheries from the ambient atmosphere.

15. A machine in accordance with claim 14 in which the materials removing means includes an enclosed trough at the bottom of the windbox means and communicating therewith, and including means for circulating material sequestering liquid therethrough.

References Cited by the Examiner

UNITED STATES PATENTS 1,607,035  11/1926  Andrews __________ 263—28 X

FOREIGN PATENTS 306,674  2/1929  Great Britain.

FREDERICK L. MATTESON, Jr., *Primary Examiner.*

JOHN J. CAMBY, *Examiner.*